United States Patent
Okura et al.

(10) Patent No.: US 11,893,814 B2
(45) Date of Patent: Feb. 6, 2024

(54) EXTRACTION METHOD, COMPUTER-READABLE RECORDING MEDIUM STORING EXTRACTION PROGRAM, AND INFORMATION PROCESSING DEVICE

(71) Applicant: FUJITSU LIMITED, Kawasaki (JP)

(72) Inventors: Seiji Okura, Setagaya (JP); Kensuke Baba, Fukuoka (JP); Tomoya Noro, Yokohama (JP); Shigeki Fukuta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 321 days.

(21) Appl. No.: 17/366,276

(22) Filed: Jul. 2, 2021

(65) Prior Publication Data
US 2021/0334576 A1    Oct. 28, 2021

Related U.S. Application Data

(63) Continuation of application No. PCT/JP2019/000083, filed on Jan. 7, 2019.

(51) Int. Cl.
*G06V 30/148* (2022.01)
*G06F 18/22* (2023.01)
*G06F 18/2113* (2023.01)

(52) U.S. Cl.
CPC ........ *G06V 30/153* (2022.01); *G06F 18/2113* (2023.01); *G06F 18/22* (2023.01)

(58) Field of Classification Search
CPC .................................................. G06V 30/153
USPC ......................................................... 707/749
See application file for complete search history.

(56) References Cited

U.S. PATENT DOCUMENTS 5,742,279 A * 4/1998 Yamamoto ......... H04N 1/00411
                                          345/173
2013/0304469 A1* 11/2013 Kamada ................ G06F 16/951
                                          704/239

(Continued)

FOREIGN PATENT DOCUMENTS

JP      2006-252064 A     9/2006
JP      2012-141752 A     7/2012

(Continued)

OTHER PUBLICATIONS

Alessio Ferrari et al., "Detecting Domain-specific Ambiguities: An NLP Approach based on Wikipedia Crawling and Word Embeddings", 2017 IEEE 25th International Requirements Engineering Conference Workshops (REW), Sep. 4, 2017, pp. 393-399, <DOI: 10.1109/REW.2017.20>, <URL:https://ieeexplore.ieee.org/abstract/document/8054883> (Total 8 pages).

(Continued)

*Primary Examiner* — Muluemebet Gurmu
(74) *Attorney, Agent, or Firm* — Fujitsu Intellectual Property Center

(57) ABSTRACT

An extraction method executed by a computer includes: acquiring a first word input by a first user; acquiring a second word input by a second user; calculating a first distributed representation of a first character string, the first character string including the first word and a character string that identifies the first user; calculating a second distributed representation of a second character string, the second character string including the second word and a character string that identifies the second user; calculating a similarity between the first distributed representation and the second distributed representation; and extracting a word associated with the second distributed representation on a basis of the similarity.

9 Claims, 18 Drawing Sheets

(56) References Cited

U.S. PATENT DOCUMENTS

2014/0108925 A1* 4/2014 Zhai .................. G06F 40/166
715/271
2022/0207070 A1* 6/2022 Higashi .............. G06F 40/279

FOREIGN PATENT DOCUMENTS

| JP | 2014-127079 A | 7/2014 |
|---|---|---|
| JP | 2017-059255 A | 3/2017 |

OTHER PUBLICATIONS

Jing Lin, "Using Distributional Similarity to Identify Individual Verb Choice", INLG' 06 Proceedings of the Fourth International Natural Language Generation Conference, Jul. 15, 2006, pp. 33-40, <URL:https://dl.acm.org/citation.cfm?id=1706278> (Total 8 pages).

Kapila Ponnamperuma et al., "Using Distributional Similarity for Identifying Vocabulary Differences between Individuals", Workshop on Computational approaches to the study of dialectal and typological variation, ESSLLI, Aug. 6, 2012, <URL: http://www.sfs.uni-tuebingen.de/~gjaeger/conferences/essli_2012/> (Total 6 pages).

International Search Report and Written Opinion of the International Searching Authority (Form PCT/ISA/210, 220, and 237), mailed in connection with PCT/JP2019/000083 and dated Mar. 19, 2019 (Total 12 pages).

JPOA—Office Action of Japanese Patent Application No. 2020-565043 dated Jul. 5, 2022 with Machine Translation.

* cited by examiner

FIG. 1

```
RANK :::PATENT^OSA
  1 ('PATENT^MAS', 0.9893)
  2 ('MAT^OSA', 0.9890)
  3 ('SUMMARY MEETING^OSA', 0.9825)
  4 ('TAK^OSA', 0.9801)
  5 ('TAK, 0.9791)
  6 ('MEETING^MAS', 0.9786)
  7 ('nmFF^OSA', 0.9715)
  8 ('PATENT^FUU', 0.9691)
  9 ('PATENT^MOO', 0.9689)
 10 ('DISCOVERY^SUZU', 0.9688)
 11 ('BRAINSTORMING MEETING^OSA', 0.9680)
 12 ('TAK^II', 0.9680)
 13 ('SUMMARY MEETING', 0.9675)
 14 ('SCHEDULE COORDINATION^SUZU', 0.9673)
 15 ('SUMMARY MEETING^II', 0.9673)
 16 ('SUMMARY^SUZU', 0.9658)
 17 ('173224013^MAS', 0.9656)
 18 ('AAPJ^MAS', 0.9635)
 19 ('COORDINATION', 0.9632)
 20 ('SUMMARY MEETING^SAI', 0.9630)
  ...
```

| WORD | SIMILARITY (AFTER NORMALIZATION) |
|---|---|
| PATENT | 1.0000 |
| MAT | 0.2988 |
| SUMMARY MEETING | 0.9234 |
| TAK | 0.6696 |
| MEETING | 0.1669 |
| nmFF | 0.1551 |
| DISCOVERY | 0.1341 |
| BRAINSTORMING MEETING | 0.1293 |
| SCHEDULE COORDINATION | 0.1186 |
| SUMMARY | 0.1131 |
| 173224013 | 0.1109 |
| AAPJ | 0.1086 |
| COORDINATION | 0.1067 |
| MAT^OSA | 0.9890 |
| SUMMARY MEETING^OSA | 0.9826 |
| TAK^OSA | 0.9802 |
| nmFF^OSA | 0.9716 |
| BRAINSTORMING MEETING^OSA | 0.9681 |

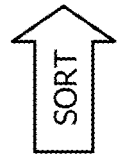
SORT

10B

| WORD | SIMILARITY (AFTER NORMALIZATION) |
|---|---|
| PATENT | 1.0000 |
| MAT^OSA | 0.9890 |
| SUMMARY MEETING^OSA | 0.9826 |
| TAK^OSA | 0.9802 |
| nmFF^OSA | 0.9716 |
| BRAINSTORMING MEETING^OSA | 0.9681 |
| SUMMARY MEETING | 0.9234 |
| TAK | 0.6696 |
| MAT | 0.2988 |
| MEETING | 0.1669 |
| nmFF | 0.1551 |
| DISCOVERY | 0.1341 |
| BRAINSTORMING MEETING | 0.1293 |
| SCHEDULE COORDINATION | 0.1186 |
| SUMMARY | 0.1131 |
| 173224013 | 0.1109 |
| AAPJ | 0.1086 |
| COORDINATION | 0.1067 |

FIG. 4

| USER ID | USER NAME |
|---------|-----------|
| user101 | OSA |
| user102 | MAS |
| user103 | SUZU |
| user104 | FUU |
| ... | ... |

| CONFERENCE ROOM NAME | MEETING NAME | PARTICIPANT LIST |
|---|---|---|
| C102A | xx MATTER/RESEARCH COMMISSION/MEETING | MURA, YAMA |
| C102A | INITIAL IN-SERVICE TRAINING/ MEETING | KI, SO |
| C102B | PATENT/SUMMARY MEETING | OSA, MASU |
| C102B | PATENT/WORKING GROUP | MASU, MURA |
| ... | ... | ... |

FIG. 6

```
                                                                    ┌140c
C102A xx MATTER^MURA xx MATTER RESEARCH COMMISSION^MURA RESEARCH COMMISSION THEME^MURA
THEME MEETING^MURA MEETING
C102A xx MATTER^YAMA xx MATTER RESEARCH COMMISSION^YAMA RESEARCH COMMISSION THEME^YAMA THEME
MEETING^YAMA MEETING
                                    :
C102A INITIAL IN-SERVICE TRAINING^KI INITIAL IN-SERVICE TRAINING^KI MEETING
C102A INITIAL IN-SERVICE TRAINING^SO INITIAL IN-SERVICE TRAINING^SO MEETING
                                    :
C102B PATENT^OSA
C102B PATENT^MAS
C102B SUMMARY MEETING^OSA
                                    :
```

FIG. 7

| CHARACTER STRING | DISTRIBUTED REPRESENTATION |
|---|---|
| xx MATTER^MURA | DISTRIBUTED REPRESENTATION OF CHARACTER STRING "xx MATTER^MURA" |
| RESEARCH COMMISSION^MURA | DISTRIBUTED REPRESENTATION OF CHARACTER STRING "RESEARCH COMMISSION^MURA" |
| ... | ... |
| PATENT^OSA | DISTRIBUTED REPRESENTATION OF CHARACTER STRING "PATENT^OSA" |
| MAT^OSA | DISTRIBUTED REPRESENTATION OF CHARACTER STRING "MAT^OSA" |
| SUMMARY MEETING^OSA | DISTRIBUTED REPRESENTATION OF CHARACTER STRING "SUMMARY MEETING^OSA" |
| ... | ... |
| SUMMARY MEETING | DISTRIBUTED REPRESENTATION OF CHARACTER STRING "SUMMARY MEETING" |
| ... | ... |

FIG. 8

| REFERENCE CHARACTER STRING | LIST |
|---|---|
| PATENT^OSA | LIST OF SIMILARITIES BETWEEN CHARACTER STRING "PATENT^OSA" AND CHARACTER STRINGS |
| SUMMARY MEETING^OSA | LIST OF SIMILARITIES BETWEEN CHARACTER STRING "SUMMARY MEETING^OSA" AND CHARACTER STRINGS |
| xx MATTER^MURA | LIST OF SIMILARITIES BETWEEN CHARACTER STRING "xx MATTER^MURA" AND CHARACTER STRINGS |
| ... | ... |

| REFERENCE CHARACTER STRING: PATENT^OSA || SIMILARITY |
|---|---|---|
| RANK | CHARACTER STRING | |
| 1 | PATENT^MAS | 0.9893 |
| 2 | MAT^OSA | 0.9890 |
| 3 | SUMMARY MEETING^OSA | 0.9825 |
| 4 | TAK^OSA | 0.9801 |
| 5 | TAK | 0.9791 |
| 6 | MEETING^MAS | 0.9786 |
| 7 | nmFF^OSA | 0.9715 |
| 8 | PATENT^FUU | 0.9691 |
| 9 | PATENT^MOO | 0.9689 |
| 10 | DISCOVERY^SUZU | 0.9688 |
| 11 | BRAINSTORMING MEETING^OSA | 0.9680 |
| 12 | TAK^II | 0.9680 |
| 13 | SUMMARY MEETING | 0.9675 |
| 14 | SCHEDULE COORDINATION^SUZU | 0.9673 |
| 15 | SUMMARY MEETING^II | 0.9673 |
| 16 | SUMMARY^SUZU | 0.9658 |
| 17 | 173224013^MAS | 0.9656 |
| 18 | AAPJ^MAS | 0.9635 |
| 19 | COORDINATION | 0.9632 |
| 20 | SUMMARY MEETING^SAI | 0.9630 |

FIG. 10

| REFERENCE CHARACTER STRING | LIST |
|---|---|
| PATENT^OSA | LIST OF SIMILARITIES BETWEEN REFERENCE CHARACTER STRING "PATENT^OSA" AND CHARACTER STRINGS |
| SUMMARY MEETING^OSA | LIST OF SIMILARITIES BETWEEN REFERENCE CHARACTER STRING "SUMMARY MEETING^OSA" AND CHARACTER STRINGS |
| xx MATTER^MURA | LIST OF SIMILARITIES BETWEEN REFERENCE CHARACTER STRING "xx MATTER^MURA" AND CHARACTER STRINGS |
| ... | ... |

| REFERENCE CHARACTER STRING: PATENT^OSA || SIMILARITY |
|---|---|---|
| RANK | CHARACTER STRING | |
| 1 | PATENT | 1.0000 |
| 2 | MAT^OSA | 0.9890 |
| 3 | SUMMARY MEETING^OSA | 0.9826 |
| 4 | TAK^OSA | 0.9802 |
| 5 | nmFF^OSA | 0.9716 |
| 6 | BRAINSTORMING MEETING^OSA | 0.9681 |
| 7 | SUMMARY MEETING | 0.9234 |
| 8 | TAK | 0.6696 |
| 9 | MAT | 0.2988 |
| 10 | MEETING | 0.1669 |
| 11 | nmFF | 0.1551 |
| 12 | DISCOVERY | 0.1341 |
| 13 | BRAINSTORMING MEETING | 0.1293 |
| 14 | SCHEDULE COORDINATION | 0.1186 |
| 15 | SUMMARY | 0.1131 |
| 16 | 173224013 | 0.1109 |
| 17 | AAPJ | 0.1086 |
| 18 | COORDINATION | 0.1067 |

FIG. 18

:::MEETING
('EXAMINATION', 0.0801)
( 'FUK', 0.0535)
('nmpj', 0.0512)
( 'SMALL', 0.0488)
('MAXIMUM, 0.0376)
('CONSULTATION', 0.0366)
('-', 0.0356)
('WEST', 0.0216)
('CONFERENCE', 0.0195)
( 'BRAINSTORMING MEETING', 0.0154)
('_', 0.0124)
('CORE', 0.0109)
('PRACTICE', 0.0101)
('REQUEST SOURCE', 0.0096)
('LEARN', 0.0059)
('1295012, NOR', 0.0017)
('GO', -0.0020)
( 'GROUP', -0.0051)
( '-TH', -0.0108)
('SUMMARY MEETING', -0.0237)
( 'nm', -0.0348)
( 'SU', -0.0406)
('WORKING GROUP', -0.0427)
...

EXTRACTION METHOD, COMPUTER-READABLE RECORDING MEDIUM STORING EXTRACTION PROGRAM, AND INFORMATION PROCESSING DEVICE

CROSS-REFERENCE TO RELATED APPLICATION

This application is a continuation application of International Application PCT/JP2019/000083 filed on Jan. 7, 2019 and designated the U.S., the entire contents of which are incorporated herein by reference.

FIELD

The embodiments discussed herein are related to an extraction method and the like.

BACKGROUND

There is a conference coordination system that coordinates a conference room according to conditions specified by a user. In the existing conference coordination system, when reservation conditions are specified by the user, conference rooms that satisfy the reservation conditions are searched and a search result is output. For example, the user specifies the number of participants to the conference, the priority of a desired conference room, the confidentiality of the conference, and the like as the reservation conditions.

Japanese Laid-open Patent Publication No. 2014-127079, Japanese Laid-open Patent Publication No. 2012-141752, and Japanese Laid-open Patent Publication No. 2006-252064 are disclosed as related art.

SUMMARY

According to an aspect of the embodiments, an extraction method executed by a computer includes: acquiring a first word input by a first user; acquiring a second word input by a second user, calculating a first distributed representation of a first character string, the first character string including the first word and a character string that identifies the first user; calculating a second distributed representation of a second character string, the second character string including the second word and a character string that identifies the second user; calculating a similarity between the first distributed representation and the second distributed representation; and extracting a word associated with the second distributed representation on a basis of the similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for describing an example of processing of an information processing device according to the present embodiment;

FIG. 2 is a diagram illustrating an example of calculation results of similarities;

FIG. 4 is a diagram illustrating an example of a data structure of a user table;

FIG. 5 is a diagram illustrating an example of a data structure of a conference information table;

FIG. 6 is a diagram illustrating an example of a data structure of text data;

FIG. 7 is a diagram illustrating an example of a data structure of a distributed representation list;

FIG. 8 is a diagram illustrating an example of a data structure of a first similarity table;

FIG. 9 is a diagram illustrating an example of a list included in the first similarity table;

FIG. 10 is a diagram illustrating an example of a data structure of a second similarity table;

FIG. 11 is a diagram illustrating an example of a list included in the second similarity table;

FIG. 18 is a diagram illustrating an example of a calculation result of similarity by the existing technology.

DESCRIPTION OF EMBODIMENTS

Figure 3:
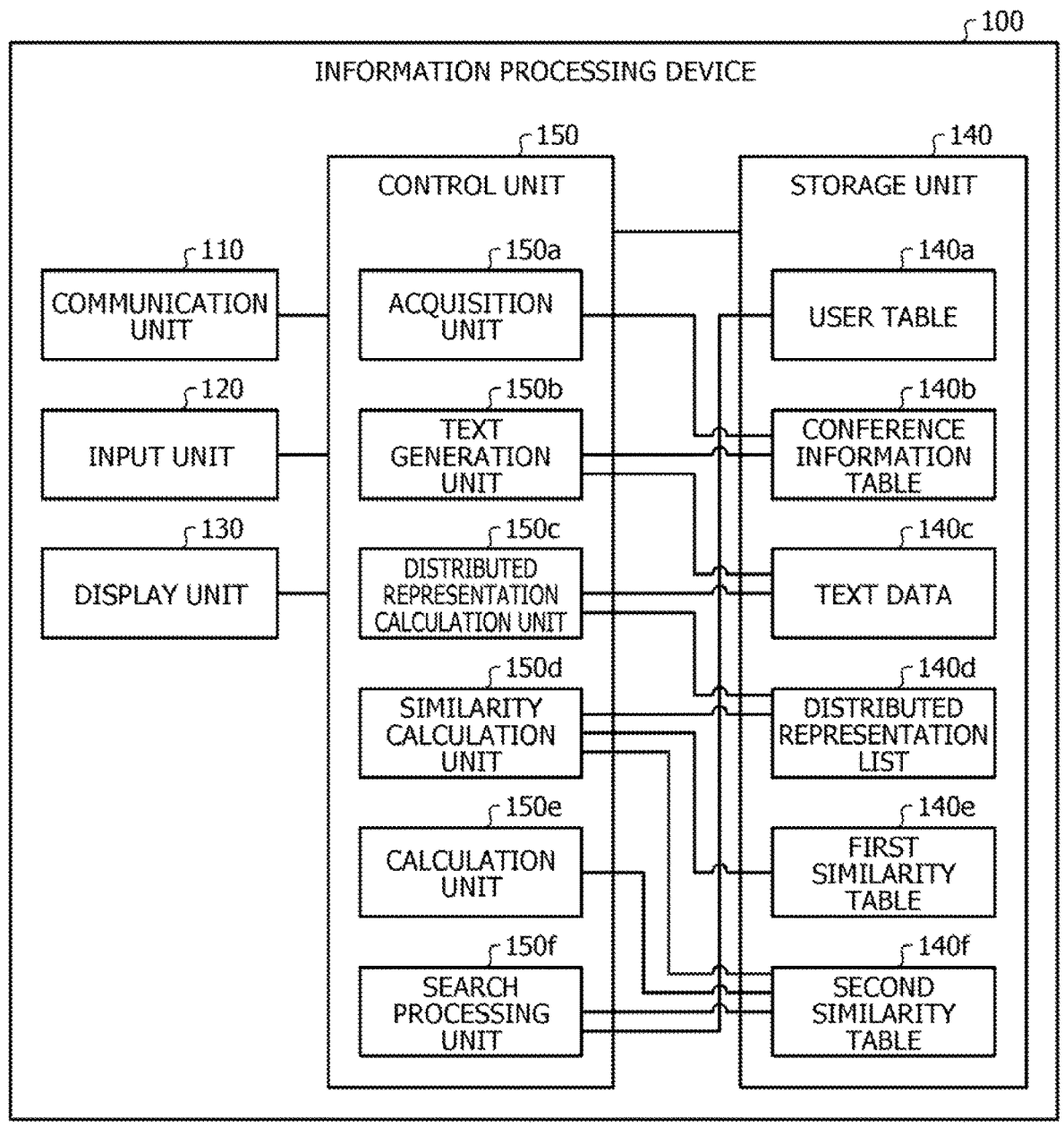
FIG. 3 is a functional block diagram illustrating a configuration of the information processing device according to the present embodiment.

Here, since the work of specifying various reservation conditions by the user each time using the conference system imposes a burden on the user, it is favorable to minimize information input by the user and search for a conference room that meets the user's needs.

For example, if a conference name similar to a "certain word" specified (voice input) by the user can be extracted, the conference room for a conference participated by the user in the past and the number of participants to the conference can be estimated from a history regarding similar conference names, and the conference room that meets the user's needs can be reserved.

As an existing technology for calculating a similarity of words, there is a technology using learning of a word distributed representation represented by word2vec. In this existing technology, text data is analyzed, words are represented in a distributed manner (word vectorization), a vector of each of the words is compared with another, and the similarity between the words is calculated.

However, in the above-described existing technology, there is a problem that similar concepts of words are not able to be extracted.

For example, in a case where the user specifies a word "meeting", it is desirable to extract a word (conference name) having a similar concept to this "meeting" from the viewpoint of the conference name. However, as in the existing technology, a lot of noise is contained if words having high similarity are extracted on the basis of the similarity obtained by simple comparison between distributed representations of the words.

FIG. 18 is a diagram illustrating an example of a calculation result of the similarity by the existing technology. The example in FIG. 18 illustrates an example of the similarity between the word "meeting" and each of other words. The words indicated by ' ' in FIG. 18 are the words compared when calculating the similarity. The numerical value next to the word is the similarity. For example, the similarity between the word "meeting" and the word "examination" is "0.08011". Here, the words are illustrated in descending order, from the one with the highest similarity to the word "meeting".

Here, although the words having a similar concept to the word "meeting" are "consultation, conference, brainstorming meeting, summary meeting, working group" in the user's view, the similarity between such words and the "meeting" is very small. In contrast, the similarity between the words "examination, FUK, nmpj, small, maximum", which do not having a similar concept to the word "meeting", and the word "meeting" is large. That is, if the similarity obtained by a simple comparison of the distributed representations of each word with the distributed representations of another word is calculated and the words with high similarity are extracted, a lot of noise is included and the similar concept of the word specified by the user can not to be extracted.

In one aspect, an extraction method, an extraction program, and an information processing device capable of extracting a similar concept of a word may be provided.

Hereinafter, embodiments of an extraction method, an extraction program, and an information processing device disclosed in the present application will be described in detail with reference to the drawings. Note that the present embodiment is not limited to this description.

Embodiment

FIG. 1 is a diagram for describing an example of processing of an information processing device according to the present embodiment. The information processing device acquires a word input by a user (or a participant to a conference) and generates a character string in which the word and the user are concatenated. For example, when the user "OSA" inputs the word "patent", the information processing device generates the character string "patent^OSA". When the user "MAS" inputs the word "patent", the information processing device generates the character string "patent^MAS". The information processing device generates a plurality of character strings by repeatedly executing the above processing for each of other users and each of other words. Note that, in a case where the information processing device acquires only a word, the information processing device does not concatenate the word with the user and uses only the word as the character string.

The information processing device calculates a distributed representation (vector) of each character string respectively on the basis of learning of a word distributed representation represented by word2vec. Furthermore, the information processing device compares the distributed representation of each character string with the distributed representation of another character string, and calculates a similarity between words. The example in FIG. 1 illustrates the similarity between the character string "patent^OSA" and each of the other character strings. The character string represented by " " in FIG. 1 is the character string corresponding to the distributed representation compared when calculating the similarity. The numerical value illustrated next to the character string is the similarity. For example, the similarity between the character string "patent^OSA" and the character string "patent^MAS" is "0.9893". Here, the character strings are illustrated in descending order, from the one with the highest similarity to the character string "patent^OSA". The rank indicates that the similarity to the character string that serves as a reference (for example, "patent^OSA") is higher as the value is smaller.

Next, the information processing device calculates the similarity of each word on the basis of the similarity of each character string. The similarity of a word is calculated according to the number of occurrences of the word included in the character string and the rank of the character string including the word. For example, the information processing device calculates the similarity between a word "wX" of a character string that serves as a reference and a word "wi" to be compared, on the basis of the equation (1).

The similarity between the word $wX$ and the word
$wi$ (before normalization)=$Vi \times \text{sqrt}(\text{sqrt}(Ui))$ (1)

In the equation (1), "Vi" represents a total of the similarities of the word wi included in the character strings up to the higher rank k, considering the rank of wi. For example, the similarity of the word wi included in the character string of the rank i (i<k) is "the similarity of the character string of the rank i (i<k)×log (i+1)". In a case where a plurality of the same words wi is present up to the higher rank k, the total of the similarities of the words wi is the value of Vi. The similarity of the word wi is smaller as the rank of the character string including the word wi is lower.

In the equation (1), "Ui" represents the number of occurrences of the word wi with respect to the character strings up to the higher rank k.

Note that, in a case where the user concatenated to the word wX and the user concatenated to the word wi are the same user, the similarity (before normalization) between the word wX and the word wi remains in the similarity of the character string including the word wi (first condition).

The similarity calculated by the equation (1) is normalized on the basis of the equation (2). norm is the similarity (before normalization) between the word Wx and the same word calculated by the equation (1). Note that, in a case where the similarity between the word Wx and the same word is not calculated, norm=1.

The similarity (after normalization) between the
word $wX$ and the word $wi$=the similarity of the
equation (1)/norm (2)

Here, processing of calculating the similarity between the word wX=patent (the word of the character string "patent^OSA") and the word wi=patent by the information processing device will be described. Description will be given in a case of k=20. Ui is as follows: In the example illustrated in FIG. 1, the number of occurrences of the word "patent" for the character strings up to the higher rank k=20 is "3", so "Ui=3".

Vi is as follows: For the character strings of the higher rank k=20, the character strings including the word "patent" are the character strings of the ranks 1, 8, and 9. Here, the similarity of the word "patent" included in the character string "patent^MAS" of the rank 1 is "0.9893×1/log (1+1)= 3.2867". The similarity of the word "patent" included in the character string "patent^FUU" of the rank 8 is "0.9691×1/log (8+1)=1.0156". The similarity of the word "patent" included in the character string "patent^MOO" of the rank 9 is "0.9689×1/log (9+1)=0.9690". Therefore, Vi=3.2867+

1.0156+0.9690=5.2713. When substituting Vi into the equation (1), the similarity (before normalization) of the word "patent" is "6.9375".

Furthermore, the norm corresponding to the word wX=patent is the similarity of the word "patent" (wX=wi), so the norm=6.9375. Therefore, when normalizing the similarity of the word "patent", the similarity is "1".

Next, processing of calculating the similarity between the word wX=patent (the word of the character string "patent^OSA") and the word wi=summary meeting by the information processing device will be described. Furthermore, description will be given in the case of k=20. Ui is as follows: In the example illustrated in FIG. 1, the number of occurrences of the word "summary meeting" for the character strings up to the higher rank k is "4", so "Ui=4".

Vi is as follows: For the character strings of the higher rank k=20, the character strings including the word "summary meeting" are the character strings of the ranks 3, 13, 15, and 20. Here, the similarity of the word "summary meeting" Included in the character string "summary meeting^OSA" of the rank 3 is "0.9826×1/log (3+1)=1.6320". The similarity of the word "summary meeting" Included in the character string "summary meeting" of the rank 13 is "0.9675×1/log (13+1)=0.8442". The similarity of the word "summary meeting" included in the character string "summary meeting" of the rank 15 is "0.9674×1/log (15+1)= 0.8034". The similarity of the word "summary meeting" included in the character string "summary meeting" of the rank 20 is "0.9630×1/log (20+1)=0.72983". Then, Vi=1.6320+0.8442+0.8034+0.72983=4.008. When substituting Vi into the equation (1), the similarity (before normalization) of the word "summary meeting" is "5.668".

Furthermore, from the above, the norm=6.9375. Therefore, according to the equation (2), the similarity (after normalization) of the word "summary meeting" is "0.8170". Note that, as for the "summary meeting^OSA", the character string "patent^OSA" that serves as a reference and the user name are the same, so the similarity is "0.9825" according to the first condition. As for the other "summary meeting, summary meeting^II, summary meeting^SAI", the user names are different, so the similarity of each of "summary meeting, summary meeting^II, summary meeting^SAI" is the similarity of "summary meeting" of "0.8170".

When the above processing is repeatedly executed for each character string, the similarity (after normalization) of each word is as illustrated in FIG. 2. FIG. 2 is a diagram illustrating an example of calculation results of the similarities. A list 10A in FIG. 2 illustrates a relationship between a word and the similarity. A list 10B is a table illustrating a result of sorting the words and the similarities by the similarity in descending order. As illustrated in the list 10B of FIG. 2, the similarities of the "summary meeting^OSA" and "brainstorming meeting" having a similar concept to the reference word "patent" are large. Furthermore, a lot of noise can be reduced. That is, according to the information processing device illustrated in the present embodiment, the processing of detecting a word having a concept similar to the designated word is improved as compared with the result of the existing technology described with reference to FIG. 18.

Next, an example of a configuration of the information processing device according to the present embodiment will be described. FIG. 3 is a functional block diagram illustrating the configuration of the information processing device according to the present embodiment. As illustrated in FIG. 3, the information processing device 100 includes a communication unit 110, an input unit 120, a display unit 130, a storage unit 140, and a control unit 150.

The communication unit 110 is a processing unit that communicates with another external device via a network. For example, the communication unit 110 receives information of a conference information table 140b, which will be described below, from an external device. The control unit 150 to be described below exchanges information with an external device via the communication unit 110. The communication unit 110 is an example of a communication device.

The input unit 120 is an input device for inputting various types of information to the information processing device 100. The input unit 120 corresponds to a keyboard, a mouse, a touch panel, and the like. For example, the user operates the input unit 120 to input a user identification (ID), a conference name (word), and the like.

The display unit 130 is a device that displays information output from the control unit 150. The display unit 130 corresponds to a liquid crystal display, a touch panel, or the like. For example, the display unit 130 displays a plurality of words (conference names) having a similar concept to the word (conference name) Input by the user. For example, the display unit 130 displays the similarity list and the like illustrated in FIG. 2.

The storage unit 140 has a user table 140a, a conference information table 140b, text data 140c, a distributed representation list 140d, a first similarity table 140e, and a second similarity table 140f. The storage unit 140 corresponds to a semiconductor memory element such as a random access memory (RAM), a read-only memory (ROM), or a flash memory, or a storage device such as a hard disk drive (HDD).

The user table 140a is a table that defines a user name for the user ID. FIG. 4 is a diagram illustrating an example of a data structure of the user table. As illustrated in FIG. 4, the user table 140a associates the user ID with the user name. For example, the user name corresponding to the user ID "user101" is "OSA".

The conference information table 140b is a table that holds various types of information regarding a conference that the user used in the past. FIG. is a diagram illustrating an example of a data structure of the conference information table. As illustrated in FIG. 5, the conference information table 140b associates a conference room name, a meeting name, and a participant list. The conference room name indicates the name of the conference room used by the user. The meeting name is information input by the user, and is information (word and character string) related to the meeting that is used when the user holds a conference. The participant list is the user name of each user who participated in the meeting.

For example, referring to a record in the first row of FIG. 5, the conference with the meeting name "XX/research commission/theme/meeting" is held in the conference room with the conference room name "C102", and the participants are "MURA, YAMA". The user may operate the input unit 120 to input the conference room name, the meeting name, and the participant list in the conference information table 140b. Alternatively, the information processing device 100 may collect information of the conference information table 140b from an external device that manages a conference use history, and register the information in the conference information table 140b.

The text data 140c is text information. FIG. 6 is a table illustrating an example of a data structure of the text data.

Each character string of the text data 140*c* illustrated in FIG. 6 is generated on the basis of the conference information table 140*b*.

The distributed representation list 140*d* is a table that holds a distributed representation of each character string. FIG. 7 is a diagram illustrating an example of a data structure of the distributed representation list. As illustrated in FIG. 7, the distributed representation list 140*d* associates a character string with a distributed representation. The character string is a concatenation of the user (user name) and the word obtained as a result of morphological analysis of the meeting name in FIG. 5. The distributed representation is a distributed representation calculated on the basis of learning of a word distributed representation represented by word2vec.

The first similarity table 140*e* is a table that holds the similarity of each character string included in the distributed representation list 140*d*. FIG. 8 is a diagram illustrating an example of a data structure of the first similarity table. As illustrated in FIG. 8, this first similarity table associates a reference character string with a list. Each list is a list respectively illustrating the similarities between a character string that serves as a reference and character strings to be compared. The character string that serves as a reference is referred to as a "reference character string". For example, the reference character string corresponds to a first character string, and the character string to be compared with the first character string corresponds to a second character string.

FIG. 9 is a diagram illustrating an example of a list included in the first similarity table. The list illustrated in FIG. 9 includes a reference character string, a rank, a character string, and a similarity. The reference character string is a character string that serves as a reference when calculating the similarity. The character string is a character string to be compared with the reference character string. The similarity indicates the similarity between the distributed representation of the reference character string and the distributed representation of the character string. The rank is a ranking of a set of the reference character string and the character string on the basis of the similarity. The similarity between the reference character string and the character string is larger as the number of the rank is smaller.

The second similarity table 140*f* is a table obtained by performing the processing described with reference to FIG. 1 for each list of the first similarity table 140*e*. FIG. 10 is a diagram illustrating an example of a data structure of the second similarity table. As illustrated in FIG. 10, the second similarity table 140*f* associates the reference character string with a list. Each list is a list respectively illustrating the similarities between the reference character string and the character strings to be compared.

FIG. 11 is a diagram illustrating an example of the list included in the second similarity table. The list illustrated in FIG. 11 includes a reference character string, a rank, a character string (word), and a similarity. The reference character string is a character string that serves as a reference when calculating the similarity. The character string is a character string to be compared with the reference character string. The similarity is a similarity obtained by performing the processing described in FIG. 1 for the similarity of each character string illustrated in FIG. 9. The rank is a ranking of a set of the reference character string and the character string on the basis of the similarity.

The description returns to FIG. 3. The control unit 150 includes an acquisition unit 150*a*, a text generation unit 150*b*, a distributed representation calculation unit 150*c*, a similarity calculation unit 150*d*, an extraction unit 150*e*, and a search processing unit 150*f*. The control unit 150 can be implemented by a central processing unit (CPU), a micro processing unit (MPU), or the like. Furthermore, the control unit 150 may also be implemented by hard wired logic such as an application specific integrated circuit (ASIC) and a field programmable gate array (FPGA).

The acquisition unit 150*a* is a processing unit that acquires information regarding the conference information table 140*b*. For example, the acquisition unit 150*a* acquires the information of the conference room name, the meeting name, and the participant list from an external device via the communication unit 110, and stores the information in the conference information table 140*b*. The external device is a device that manages the conference use history. Alternatively, the user operates the input unit 120 to input the information of the conference room name, the meeting name, and the participant list, and the acquisition unit 150*a* may acquire the input information and stores the information in the conference information table 140*b*.

The text generation unit 150*b* is a processing unit that generates the text data 140*c* on the basis of the meeting name and the participant list of the conference information table 140*b*. For example, the text generation unit 150*b* extracts the record of the conference information table 140*b* and arranges a conference room included in the record. Furthermore, the text generation unit 150*b* generates text data by performing a morphological analysis for the meeting name and concatenating each morpheme with each user in the participant list.

For example, the conference room name of the record is "conference room A", and the morpheme (morpheme list) obtained by performing a morphological analysis for the meeting name is "w1, w2, w3, . . . , Wn". Furthermore, the users included in the participant list are "p1, p2, . . . , pm". In this case, the text generation unit 150*b* generates the following text data:

conference room A w1 w2 . . . wn w1^p1 w2^p1 . . . wn^p1
conference room A w1 w2 . . . wn w1^p2 w2^p2 . . . wn^p2
. . .
conference room A w1 w2 . . . wn w1^pm w2^pm . . . wn^pm The text generation unit 150*b* generates a plurality of text data by repeatedly executing the above-described above processing for each user of each record of the conference information table 140*b*, and generates the text data 140*c* by collecting the plurality of generated text data. The text generation unit 150*b* stores the text data 140*c* in the storage unit 140.

The distributed representation calculation unit 150*c* is a processing unit that calculates (learns) the distributed representation (vector) of each character string included in the text data 140*c* on the basis of learning of a word distributed representation represented by word2vec. The distributed representation calculation unit 150*c* stores the character string and the distributed representation in association with each other in the distributed representation list 140*d*. For example, the distributed representation calculation unit 150*c* calculates the distributed representation for the character string (for example, w^p) in which the word and the user are concatenated in the text data 140*c*.

The similarity calculation unit 150*d* is a processing unit that calculates the similarity of each character string. The similarity calculation unit 150*d* generates the first similarity table 140*e* on the basis of the distributed representation list 140*d*. Furthermore, the similarity calculation unit 150*d* generates the second similarity table 140*f* on the basis of the first similarity table 140*e*.

The processing of generating the first similarity table 140e by the similarity calculation unit 150d will be described. The similarity calculation unit 150d selects the reference character string from each character string in the distributed representation list 140d, compares the distributed representation of the selected reference character string with the distributed representation of each of the character strings respectively, and calculates the similarity for each character string. For example, the similarity calculation unit 150d calculates a distance between the distributed representation (vector) of the reference character string and the distributed representation (vector) of another character string as the similarity. The similarity calculation unit 150d stores each similarity between the above-described reference character string and each of the other character strings as a list in the first similarity table 140e. For example, the list in a case where the reference character string is "patent^OSA" is the list illustrated in FIG. 9. The similarity calculation unit 150d sorts the character strings and the similarities by the similarity in descending order and sets ranks.

The similarity calculation unit 150d generates the information of the first similarity table 140e by generating the list corresponding to the selected reference character strings by selecting the reference character string from the character strings in the distributed representation list 140d and repeatedly executing the above-described processing. The similarity calculation unit 150d stores the first similarity table 140e in the storage unit 140.

Next, the processing of generating the second similarity table 140f on the basis of the first similarity table 140e by the similarity calculation unit 150d will be described. Processing of the similarity calculation unit 150d corresponds to the processing described with reference to FIG. 1.

That is, the similarity calculation unit 150d selects a record in the first similarity table 140e, and performs the following processing for the list included in the selected record. The similarity calculation unit 150d calculates the similarity (before normalization) between the word wX of the reference character string and the word wi of the character string to be compared on the basis of the equation (1), and calculates the similarity (after normalization) on the basis of the equation (2).

The similarity calculation unit 150d calculates the similarity of the list by repeatedly executing the above-described processing for each character string included in the list, and registers the similarity in the second similarity table 140f. The similarity calculation unit 150d calculates the information of the second similarity table 140f by repeatedly executing the above-described processing for each record of the first similarity table 140e, and stores the information in the storage unit 140.

First, processing of calculating the similarity between the word wX=patent (the word of the reference character string "patent^OSA") and the word wi=patent illustrated in FIG. 9 (FIG. 1) by the similarity calculation unit 150d will be described. Description will be given in a case of k=20.

The similarity calculation unit 150d calculates Ui as follows. The similarity calculation unit 150d scans the character strings of the list and counts the number of times the word "patent" appears in the character strings. In the example illustrated in FIG. 9, "Ui=3".

The similarity calculation unit 150d calculates Vi as follows. The similarity calculation unit 150d scans the character strings in the list and specifies the rank of the character string including the word "patent" for each character string of the higher rank k=20. In the example illustrated in FIG. 9, the character strings including the word "patent" are the character strings of the ranks 1, 8, and 9.

The similarity calculation unit 150d calculates the similarity of the word "patent" included in the character string "patent^MAS" of the rank 1 by "0.9893×1/log (1+1)= 3.2867". The similarity calculation unit 150d calculates the similarity of the word "patent" included in the character string "patent^FUU" of the rank 8 by "0.9691×1/log (8+1)= 1.0156". The similarity calculation unit 150d calculates the similarity of the word "patent" included in the character string "patent^MOO" of the rank 9 by "0.9689×1/log (9+1)= 0.9690".

The similarity calculation unit 150d calculates Vi by calculating the total of the similarities of the word "patent". Specifically, Vi=3.2867+1.0156+0.9690=5.2713. The similarity calculation unit 150d calculates the similarity (before normalization) of the word "patent" as "6.9375" by using "Ui=3" and "Vi=5.2713" and the equation (1).

Furthermore, the norm corresponding to the word wX=patent is the similarity of the word "patent" (wX=wi), so the norm=6.9375. Therefore, when the similarity calculation unit 150d normalizes the similarity of the word "patent" on the basis of the equation (2), the similarity is "1".

Next, processing of calculating the similarity between the word wX=patent (the word of the reference character string "patent^OSA") and the word wi=summary meeting illustrated in FIG. 9 (FIG. 1) by the similarity calculation unit 150d will be described. Description will be given in a case of k=20.

The similarity calculation unit 150d calculates Ui as follows. The similarity calculation unit 150d scans the character strings of the list and counts the number of times the word "summary meeting" appears in the character strings. In the example illustrated in FIG. 9, "Ui=4".

The similarity calculation unit 150d calculates Vi as follows. The similarity calculation unit 150d scans the character strings in the list and specifies the rank of the character string including the word "summary meeting" for each character string of the higher rank k=20. In the example illustrated in FIG. 9, the character strings including the word "summary meeting" are character strings of the ranks 3, 13, 15, and 20.

The similarity calculation unit 150d calculates the similarity of the word "summary meeting" included in the character string "summary meeting^OSA" of the rank 3 by "0.9826×1/log (3+1)=1.6320". The similarity calculation unit 150d calculates the similarity of the word "summary meeting" included in the character string "summary meeting" of the rank 13 by "0.9675×1/log (13+1)=0.8442". The similarity calculation unit 150d calculates the similarity of the word "summary meeting" included in the character string "summary meeting" of the rank 15 by "0.9674×1/log (15+1)=0.8034". The similarity calculation unit 150d calculates the similarity of the word "summary meeting" included in the character string "summary meeting" of the rank 20 by "0.9630×1/log (20+1)=0.72983".

The similarity calculation unit 150d calculates Vi by calculating the total of the similarities of the word "summary meeting". Specifically, Vi=1.6320+0.8442+0.8034+ 0.72983=4.008. The similarity calculation unit 150d calculates the similarity (before normalization) of the word "patent" as "5.668" by using "Ui=4" and "Vi=4.008" and the equation (1).

Note that, in the case of calculating the similarity of patent, the similarity calculation unit 150d has already calculated that norm=5.668. The similarity calculation unit 150*d* calculates the similarity (after normalization) "0.8170" of the word "summary meeting" by the equation (2).

Note that, as for the "summary meeting^OSA", the character string that serves as a reference "patent^OSA" and the user name are the same, so the similarity is "0.9825" on the basis of the first condition. As for the other "summary meeting, summary meeting^II, summary meeting^SAI", the user names are different, so the similarity of each of "summary meeting, summary meeting^II, summary meeting^SAI" is the similarity of "summary meeting" of "0.8170".

The similarity calculation unit 150*d* generates the list of the second similarity table 140*f* illustrated in FIG. 11 from the list of the first similarity table 140*e* Illustrated in FIG. 9 by performing the above-described processing for the words of the other character strings. The similarity calculation unit 150*d* sorts the character strings and the similarities by the similarity in descending order and sets ranks.

The similarity calculation unit 150*d* generates the information of each list of the second similarity table 140*f* in FIG. 10 by repeatedly executing the above-described processing for each list of the first similarity table 140*e* in FIG. 8. The similarity calculation unit 150*d* stores the information of each list of the second similarity table 140*f* in the second similarity table 140*f*.

The description returns to FIG. 3. The extraction unit 150*e* is a processing unit that extracts a character string (word) similar to each reference character string on the basis of the second similarity table 140*f*. For example, the extraction unit 150*e* extracts information of the character strings and the similarities up to the rank L for each reference character string on the basis of the second similarity table 140*f*, and outputs an extracted extraction result to the display unit 130. Alternatively, the extraction unit 150*e* transmits the information of the character strings and the similarities up to the rank L to an external device. "L" is a natural number of 1 or more that is set as appropriate.

The search processing unit 150*f* is a processing unit that searches for the meeting name and the word having a similar concept in a case of receiving an input of the user ID and the meeting name (X) from the input unit 120. The search processing unit 150*f* outputs a search result to the display unit 130 and displays the search result. Hereinafter, an example of processing of the search processing unit 150*f* will be described.

The search processing unit 150*f* compares the user ID with the user table 140*a* and acquires the user name corresponding to the user ID. The search processing unit 150*f* performs a morphological analysis for the meeting name and generates the morpheme list. The search processing unit 150*f* creates a search character string by concatenating the morpheme and the user name for each morpheme included in the morpheme list. For example, in the case where the morpheme is "summary meeting" and the user name is "OSA", the search processing unit 150*f* generates the search character string "summary meeting^OSA". In a case where there is a plurality of morphemes, a plurality of search character strings is generated.

The search processing unit 150*f* compares the search character string with the reference character string of the second similarity table 140*f*, specifies a record including the same reference character string as the search character string, and acquires a list included in the specified record. The search processing unit 150*f* acquires each character string included in the acquired list and the similarity. In the following description, a word included in each character string included in the acquired list is referred to as a "synonym". Furthermore, the similarity of the character string including the synonyms is expressed as "score" of the synonym.

The search processing unit 150*f* compares the synonym with the meeting name in the conference information table 140*b*, specifies the meeting name (Y) including the synonym, and adds the score of the synonym to the score corresponding to the specified meeting name. An initial value of the score corresponding to each meeting name is set to "0".

The search processing unit 150*f* may normalize the score for the meeting name. For example, the score corresponding to the meeting name is normalized on the basis of the equation (3). N included in the equation (3) is a value obtained by dividing the number of morphemes of the meeting name (X) by the number of morphemes of the meeting name (Y). Note that, in a case where N is larger than 1, the value of N is updated with a value obtained by dividing the number of morphemes of the meeting name (Y) by the number of morphemes of the meeting name (X).

$$\text{The score (after normalization)} = \text{the score (before normalization)}/N \qquad (3)$$

The search processing unit 150*f* calculates the score for each meeting name (Y) by repeatedly executing the above-described processing. The search processing unit 150*f* sorts the meeting names (Y) by the score in descending order, searches for the meeting names of the higher rank M, and outputs the meeting names to the display unit 130.

Figure 12:
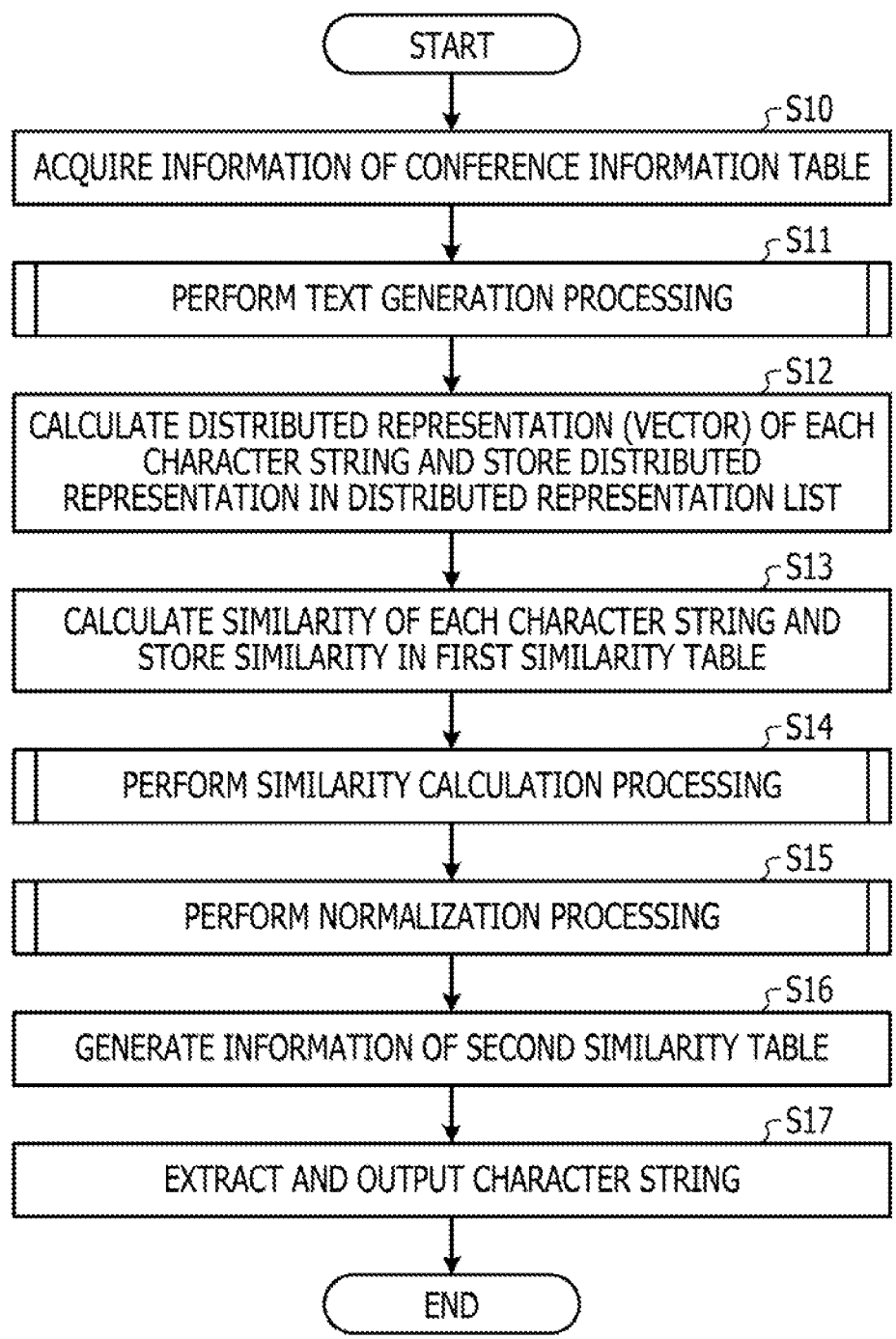
FIG. 12 is a flowchart illustrating a processing procedure of the information processing device according to the present embodiment.

Next, an example of a processing procedure of the information processing device 100 according to the present embodiment will be described. FIG. 12 is a flowchart illustrating a processing procedure of the information processing device according to the present embodiment. As illustrated in FIG. 12, the acquisition unit 150*a* of the information processing device 100 acquires the information of the conference information table 140*b* from the external device or the input unit 120 (step S10). The text generation unit 150*b* of the information processing device 100 executes text generation processing (step S11).

The distributed representation calculation unit 150*c* of the information processing device 100 calculates the distributed representation (vector) of each character string and stores the distributed representation in the distributed representation list 140*d* (step S12). The similarity calculation unit 150*d* of the information processing device 100 calculates the similarity of each character string and stores the similarity in the first similarity table 140*e* (step S13).

The similarity calculation unit 150*d* executes similarity calculation processing (step S14). The similarity calculation unit 150*d* executes normalization processing (step S15). The similarity calculation unit 150*d* generates the information of the second similarity table (step S16). The extraction unit 150*e* of the information processing device 100 extracts and outputs the high-ranked character strings in higher ranks of each list in the second similarity table 140*f* (step S17).

Figure 13:
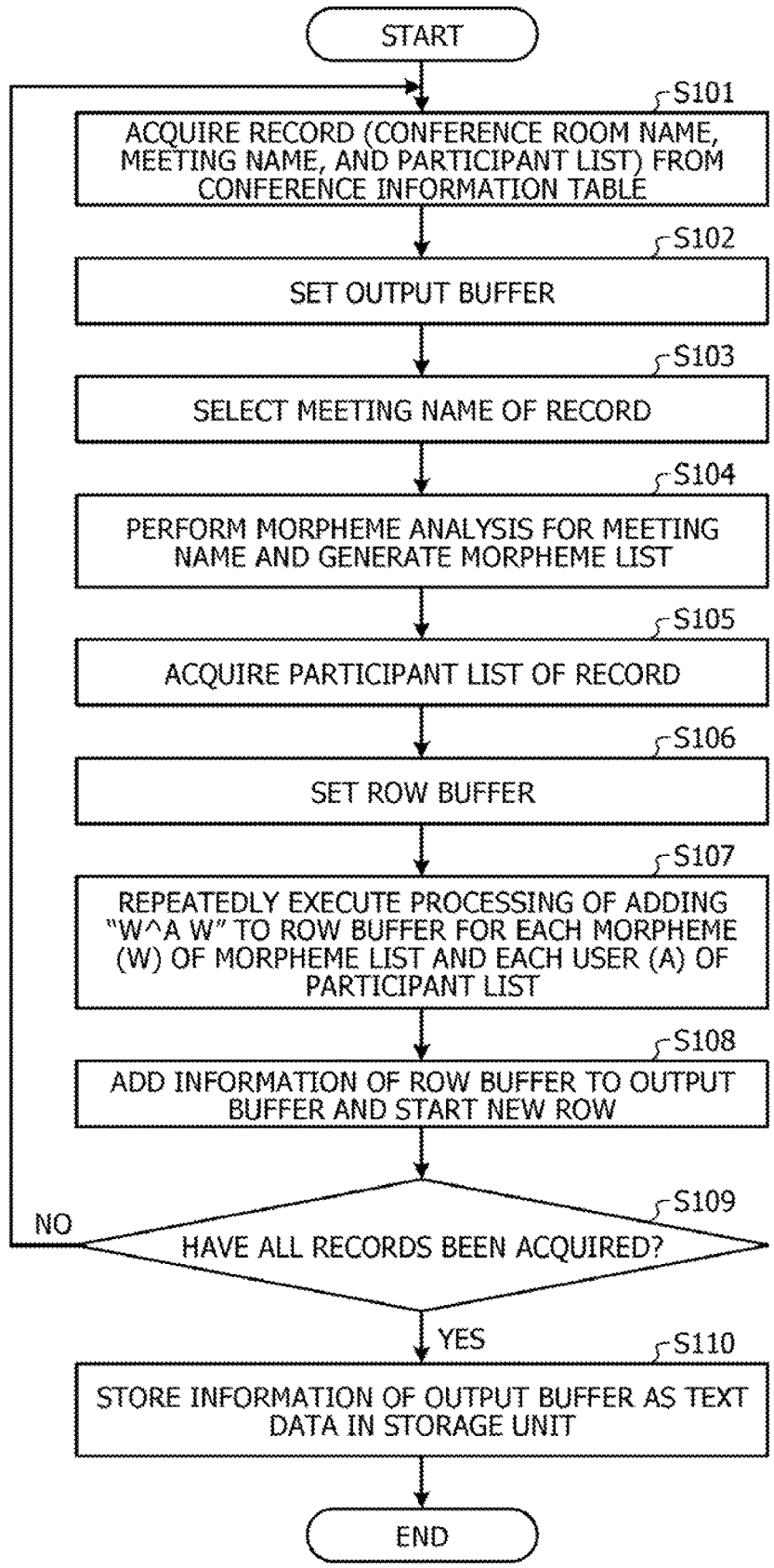
FIG. 13 is a flowchart illustrating a processing procedure for text generation processing.

Next, an example of the text generation processing illustrated in step S11 of FIG. 12 will be described. FIG. 13 is a flowchart illustrating a processing procedure for the text generation processing. As illustrated in FIG. 13, the text generation unit 150*b* of the information processing device 100 acquires a record from the conference information table 140*b* (step S101).

The text generation unit 150*b* sets an output buffer in the storage unit 140 (step S102). The text generation unit 150*b* selects the meeting name of the record (step S103). The text generation unit 150*b* performs a morphological analysis for the meeting name and generates the morpheme list (step S104). The text generation unit 150b acquires the participant list of the record (step S105).

The text generation unit 150b sets a row buffer in the storage unit 140 (step S106). The text generation unit 150b repeatedly executes processing of adding "W^A W" to the row buffer for each morpheme (W) in the morpheme list and each user (A) in the participant list (step S107).

The text generation unit 150b adds the row buffer information to the output buffer and starts a new row (step S108). The text generation unit 150b determines whether all the records have been acquired from the conference information table 140b (step S109). In a case where all the records have not been acquired from the conference information table 140b (step S109, No), the text generation unit 150b proceeds to step S101.

On the other hand, in a case where all the records have been acquired from the conference information table 140b (step S109, Yes), the text generation unit 150b proceeds to step S110. The text generation unit 150b stores the information of the output buffer as the text data 140c in the storage unit 140 (step S110).

Figure 14:
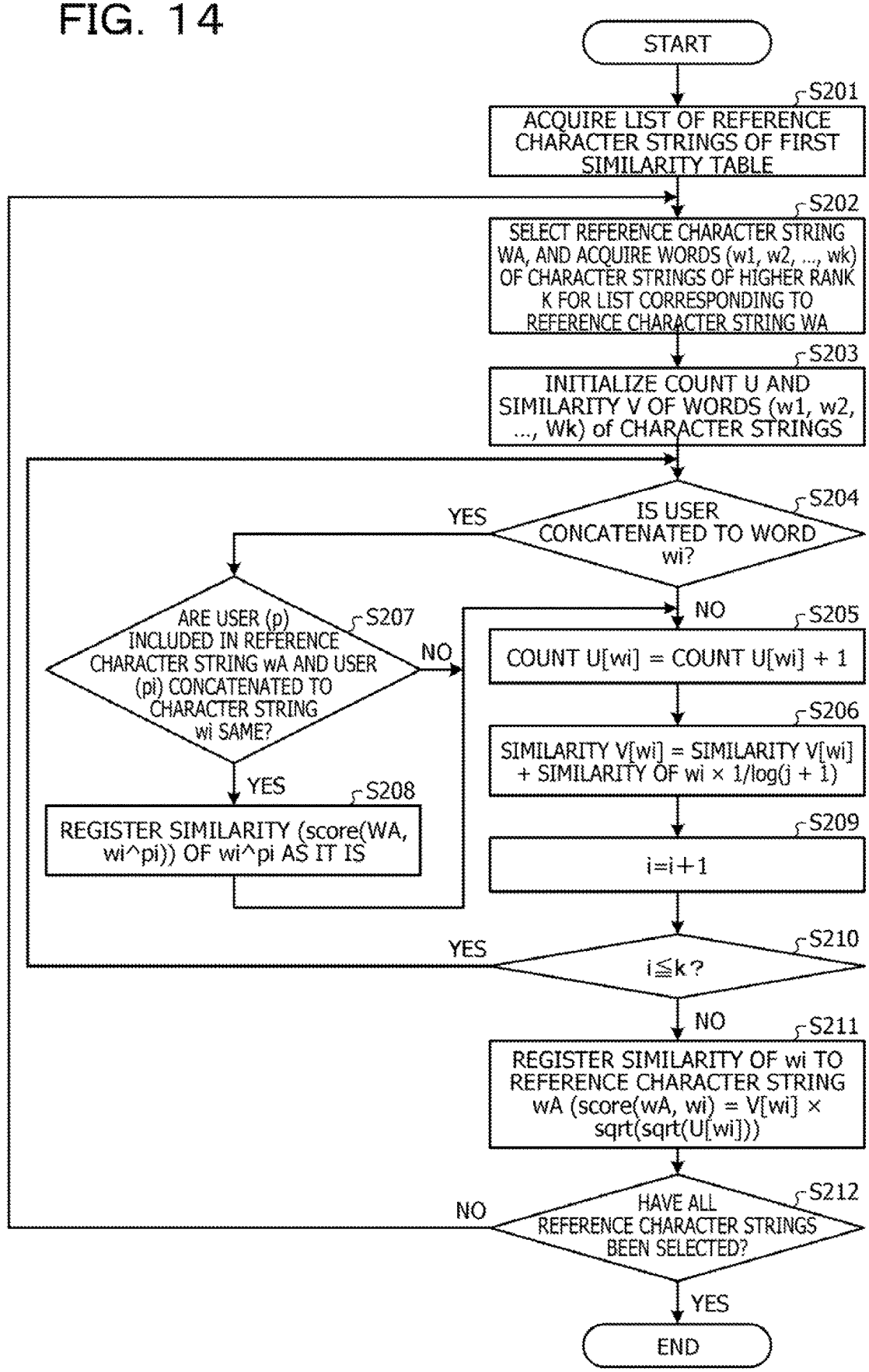
FIG. 14 is a flowchart illustrating a processing procedure for similarity calculation processing.

Next, an example of the similarity calculation processing illustrated in step S14 of FIG. 12 will be described. FIG. 14 is a flowchart illustrating a processing procedure for the similarity calculation processing. As illustrated in FIG. 14, the similarity calculation unit 150d acquires a list of the reference character strings in the first similarity table (step S201).

The similarity calculation unit 150d selects the reference character string WA and acquires the words (wi, w2, ..., Wk) of the character strings of the higher rank k for the list corresponding to the reference character string WA (step S202). The similarity calculation unit 150d initializes the count U and the similarity V of the words (w1, w2, ..., Wk) of the character strings (step S203).

In a case where the user (user name) is not concatenated to the word wi (step S204, No), the similarity calculation unit 150d proceeds to step S205. On the other hand, in a case where the user (user name) is concatenated to the word wi (step S204, Yes), the similarity calculation unit 150d proceeds to step S207.

The processing of step S205 will be described. The similarity calculation unit 150d performs processing of adding 1 to the count U [wi] (step S205). The similarity calculation unit 150d performs processing of adding the similarity of wi×1/log (i+1) to the similarity V [wi] (step S206) and proceeds to step S209.

The processing of step S207 will be described. The similarity calculation unit 150d determines whether the user (p) included in the reference character string WA and the user (pi) included in the character string wi are the same (step S207). In a case where the user (p) included in the reference character string WA and the user (pi) included in the character string wi are not the same (step S207, No), the similarity calculation unit 150d proceeds to step S205.

On the other hand, in a case where the user (p) included in the reference character string WA and the user (pi) included in the character string wi are the same (step S207, Yes), the similarity calculation unit 150d registers the similarity of wi^pi (score (WA, wi)) as it is (step S208) and proceeds to step S205.

The similarity calculation unit 150d adds 1 to i (step S209). In a case where i is k or less (step S210, Yes), the similarity calculation unit 150d proceeds to step S204. On the other hand, in a case where i is larger than k (step S210, No), the similarity calculation unit 150d proceeds to step S211.

The similarity calculation unit 150d registers the similarity of wi to the reference character string WA (step S211). In the case where all the reference character strings have not been selected (step S212, No), the similarity calculation unit 150d proceeds to step S202. On the other hand, in the case where all the reference character strings have been selected (step S212, Yes), the similarity calculation unit 150d terminates the processing.

Figure 15:
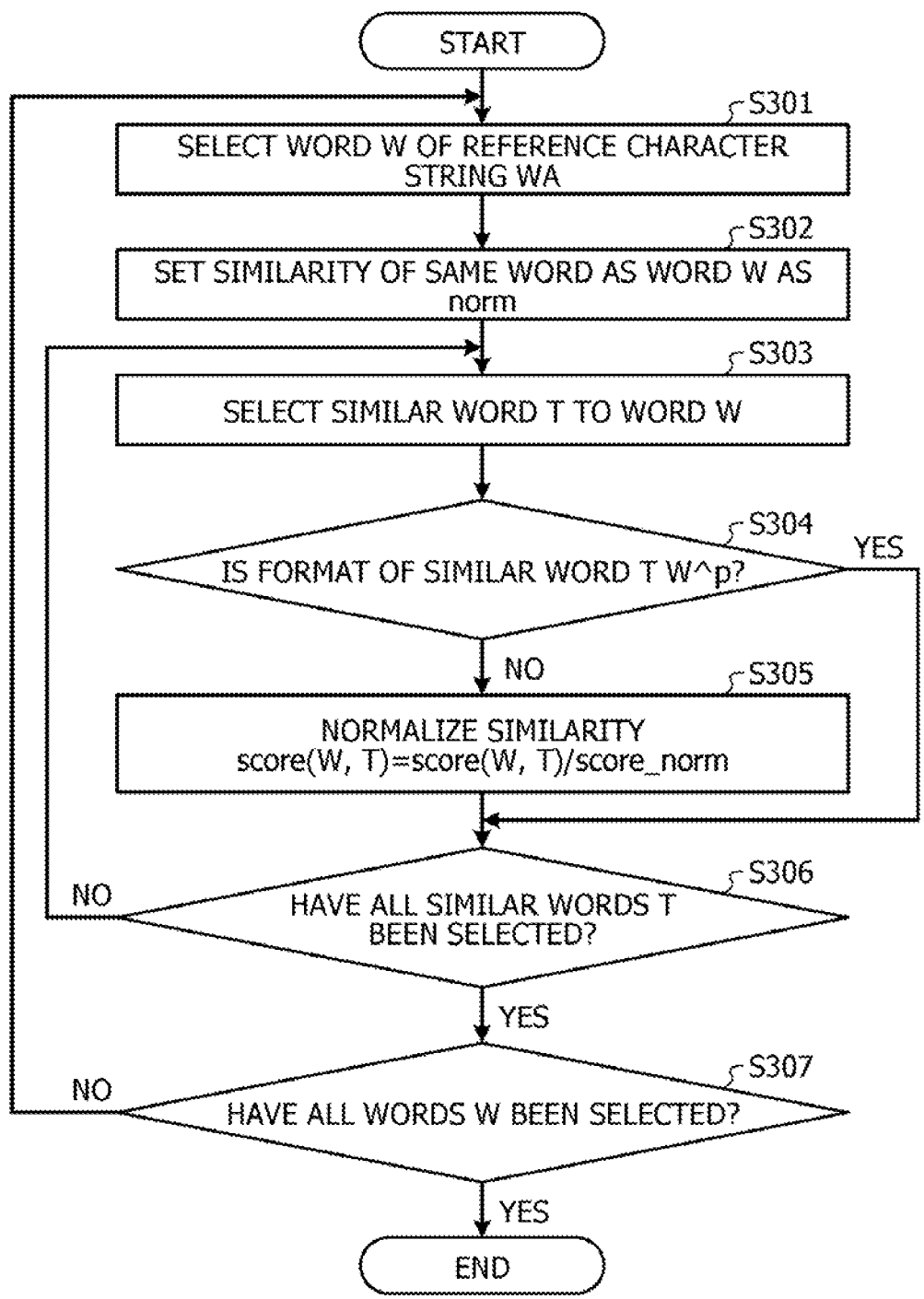
FIG. 15 is a flowchart illustrating a processing procedure for a normalization processing.

Next, an example of the normalization processing illustrated in step S15 of FIG. 12 will be described. FIG. 15 is a flowchart illustrating a processing procedure for the normalization processing. As illustrated in FIG. 15, the similarity calculation unit 150d selects the word W of the reference character string WA (step S301). The similarity calculation unit 150d sets the similarity of the same word as the word W (wX) as norm (step S302).

The similarity calculation unit 150d selects a similar word T (wi) to the word W (step S303). In a case where the format of the similar word T is w^p (step S304, Yes), the similarity calculation unit 150d proceeds to step S306. On the other hand, in a case where the format of the similar word T is not w^p (step S304, No), the similarity calculation unit 150d normalizes the similarity between the word W and a similar word TT (step S305).

In the case where all the similar words T have not been selected (step S306), the similarity calculation unit 150d proceeds to step S303. On the other hand, in the case where all the similar words T have been selected (step S306, Yes), the similarity calculation unit 150d proceeds to step S307.

In a case where all the words W have not been selected (step S307, No), the similarity calculation unit 150d proceeds to step S301. On the other hand, in the case where all the words W have been selected (step S307, Yes), the similarity calculation unit 150d terminates the processing.

Figure 16:
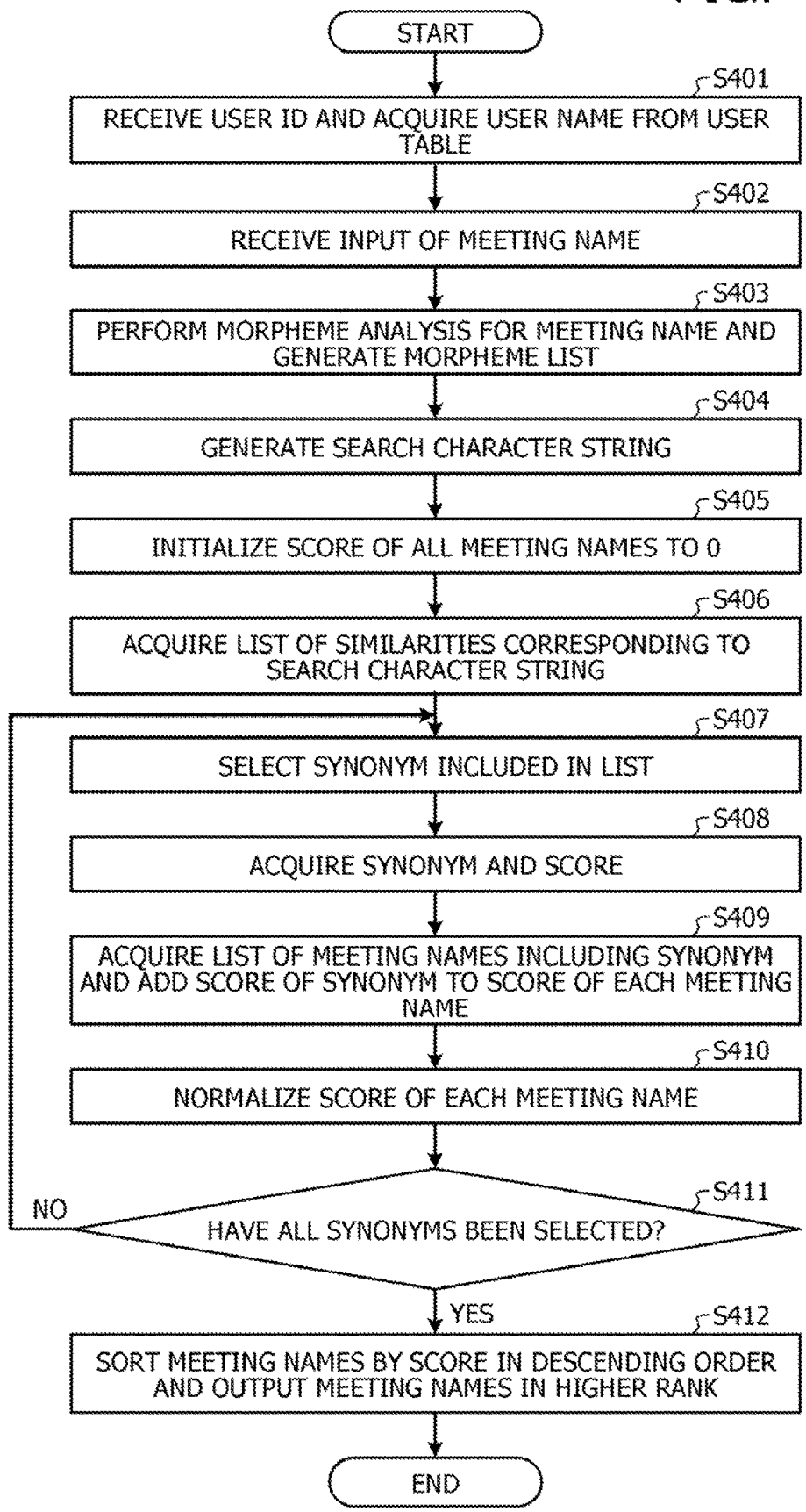
FIG. 16 is a flowchart illustrating a processing procedure of a search processing unit.

Next, an example of a processing procedure executed by the search processing unit 150f of the information processing device 100 according to the present embodiment will be described. FIG. 16 is a flowchart illustrating a processing procedure of the search processing unit. As illustrated in FIG. 16, the search processing unit 150f of the information processing device 100 receives the user ID from the input unit 120 and acquires the user name from the user table 140a (step S401). The search processing unit 150f receives an input of the meeting name from the input unit 120 (step S402).

The search processing unit 150f performs a morphological analysis of the meeting name and generates the morpheme list (step S403). The search processing unit 150f generates the search character string (step S404). The search processing unit 150f initializes the scores of all the meeting names to 0 (step S405).

The search processing unit 150f acquires a list of similarities corresponding to the search character string from the second similarity table 140f (step S406). The search processing unit 150f selects a synonym included in the list (step S407). The search processing unit 150f acquires the synonym and the score (step S408).

The search processing unit 150f acquires a list of meeting names including the synonym and adds the score of the synonym to the score for each meeting name (step S409). The search processing unit 150f normalizes the score of each meeting name (step S410).

In the case where all the synonyms have not been selected (step S411, No), the search processing unit 150f proceeds to step S407. On the other hand, the search processing unit 150*f* sorts the meeting names by the score in descending order and outputs the meeting names in the higher rank to the display unit 130 (step S412).

Next, effects of the information processing device 100 according to the present embodiment will be described. The information processing device 100 respectively compares the distributed representations of the character strings in which the word (morpheme) of the meeting name and the user name are concatenated on the basis of the users and the meeting names of the participant list of a conference, and calculates the similarity. Thereby, the word having a similar concept to the word of a certain meeting can be detected.

For example, since the character string to which the distributed representation is assigned includes the morphemes of the user name and the meeting name, the word having a similar concept to the word of a certain meeting is detected, taking advantage of the tendency that the character strings including the users who participated in the same meeting have distributed representations similar to each other as compared with the character strings not including the users who do not participate in the same meeting.

For example, the list of synonyms calculated by the information processing device 100 is illustrated in 10B of FIG. 2 above. As illustrated in the list 108 of FIG. 2, the similarities of the "summary meeting^OSA" and "brainstorming meeting" having a similar concept to the reference word "patent" are large. Furthermore, a lot of noise can be reduced. That is, according to the information processing device illustrated in the present embodiment, the processing of detecting a word having a concept similar to the designated word is improved as compared with the result of the existing technology described with reference to FIG. 18.

The information processing device 100 compares the distributed representation of the reference character string with the distributed representation of the character string to be compared, calculates the similarity, and generates the first similarity table 140*e*. Furthermore, the information processing device 100 acquires the list corresponding to the reference character string from the first similarity table 140*e*, and calculates (corrects) the similarity of the character string to be compared on the basis of the rank of the character string to be compared included in the list. Thereby, the similarity can be set to be larger as the rank is higher, and the detection accuracy can be improved.

The information processing device 100 calculates (corrects) the similarity of the character string to be compared on the basis of the number of occurrences of the word of the character string to be compared, of the higher rank k of the character strings to be compared included in the list. Thereby, the similarity of the word having a large number of occurrences can be set to be large, among the words included in the character strings of the higher rank k, and the detection accuracy can be improved. k is a preset value.

Figure 17:
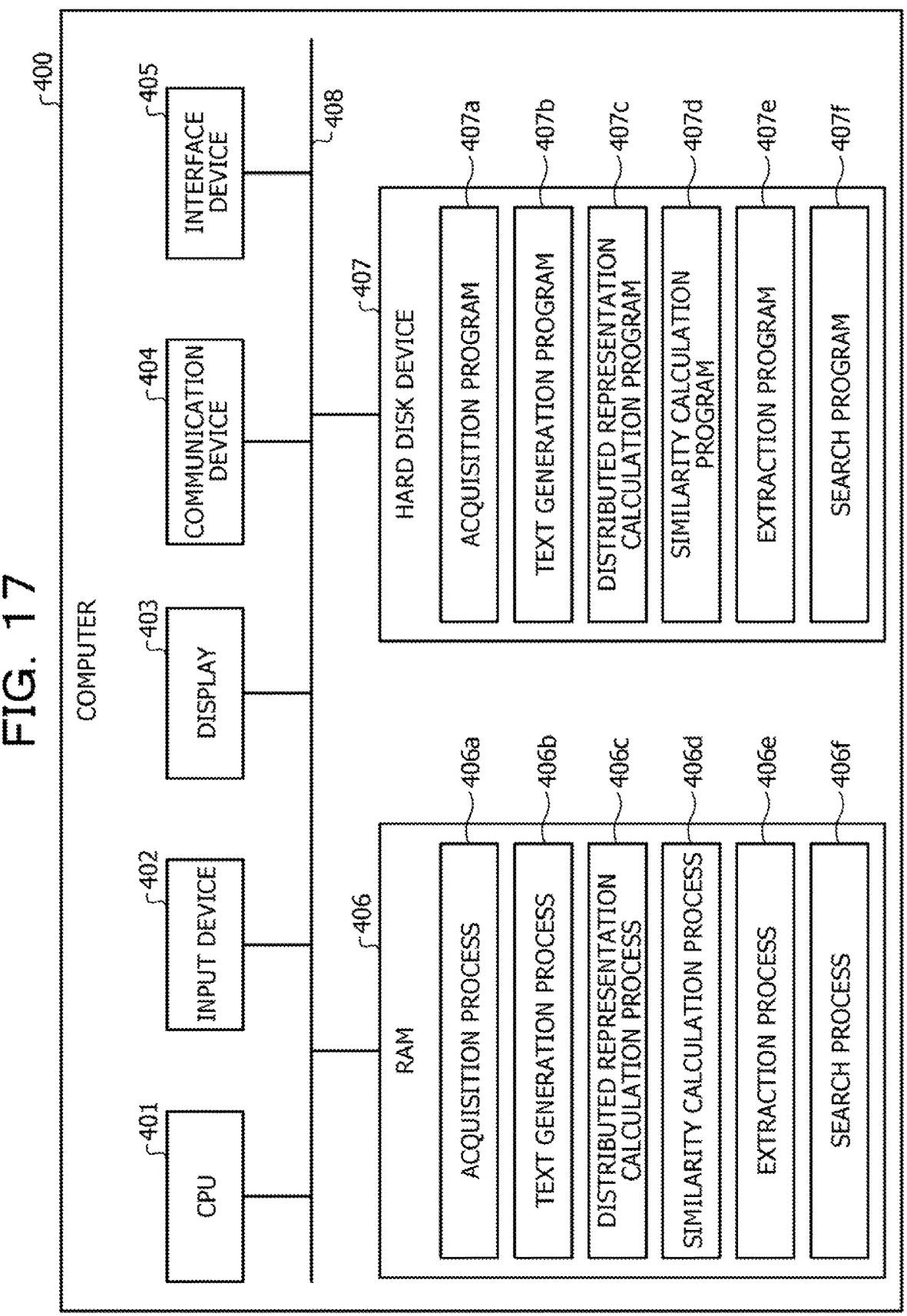
FIG. 17 is a diagram illustrating an example of a hardware configuration of a computer that implements functions similar to the information processing device according to the present embodiment.

FIG. 17 is a diagram illustrating an example of a hardware configuration of a computer that implements functions similar to the information processing device according to the present embodiment.

As illustrated in FIG. 17, a computer 400 includes a CPU 401 that executes various kinds of calculation processing, an input device 402 that accepts data input from a user, and a display 403. Furthermore, the computer 400 includes a reading device 404 that reads a program and the like from a storage medium, and an interface device 405 that exchanges data with an external device and the like via a wired or wireless network. The computer 400 includes a RAM 406 that temporarily stores various types of information, and a hard disk device 407. Then, each of the devices 401 to 407 is connected to a bus 408.

The hard disk device 407 includes an acquisition program 407*a*, a text generation program 407*b*, a distributed representation calculation program 407*c*, a similarity calculation program 407*d*, an extraction program 407*e*, and a search program 407*f*. The CPU 401 reads the acquisition program 407*a*, the text generation program 407*b*, the distributed representation calculation program 407*c*, the similarity calculation program 407*d*, the extraction program 407*e*, and the search program 407*f*, and expands the read programs in the RAM 406.

The acquisition program 407*a* functions as an acquisition process 406*a*. The text generation program 407*b* functions as a text generation process 406*b*. The distributed representation calculation program 407*c* functions as a distributed representation calculation process 406*c*. The similarity calculation program 407*d* functions as a similarity calculation process 406*d*. The extraction program 407*e* functions as an extraction process 406*e*. The search program 407*f* functions as a search process 406*f*.

Processing of the acquisition process 406*a* corresponds to the processing of the acquisition unit 150*a*. Processing of the text generation process 406*b* corresponds to the processing of the text generation unit 150*b*. Processing of the distributed representation calculation process 406*c* corresponds to the processing of the distributed representation calculation unit 150*c*. Processing of the similarity calculation process 406*d* corresponds to the processing of the similarity calculation unit 150*d*. Processing of the extraction process 406*e* corresponds to the processing of the extraction unit 150*e*. Processing of the search program 407*f* corresponds to the processing of the search processing unit 150*f*.

Note that each of the programs 407*a* to 407*f* may not need to be stored in the hard disk device 407 beforehand. For example, each of the programs may be stored in a "portable physical medium" such as a flexible disk (FD), a compact disc (CD)-ROM, a digital versatile disk (DVD), a magneto-optical disk, or an integrated circuit (IC) card to be inserted in the computer 400. Then, the computer 400 may read and execute each of the programs 407*a* to 407*f*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An extraction method executed by a computer, the method comprising processing of:
   acquiring a first word input by a first user;
   acquiring a second word input by a second user;
   calculating a first distributed representation of a first character string, the first character string including the first word and a character string that identifies the first user;
   calculating a second distributed representation of a second character string, the second character string including the second word and a character string that identifies the second user;

calculating a similarity between the first distributed representation and the second distributed representation; and extracting a word associated with the second distributed representation on a basis of the similarity.

2. The extraction method according to claim 1, wherein the processing of calculating the first distributed representation includes calculating the first distributed representation of the first character string in which the first word and the character string that identifies the first user are concatenated, and the processing of calculating the second distributed representation includes calculating the second distributed representation of the second character string in which the second word and the character string that identifies the second user are concatenated.

3. The extraction method according to claim 2, wherein the processing of extracting a word includes: sorting the plurality of second character strings by the similarity in descending order on a basis of the corrected similarity; and extracting the word included in the second character string in the higher rank.

4. A non-transitory computer-readable recording medium storing an extraction program causing a computer to execute processing of:

acquiring a first word input by a first user;

acquiring a second word input by a second user;

calculating a first distributed representation of a first character string, the first character string including the first word and a character string that identifies the first user;

calculating a second distributed representation of a second character string, the second character string including the second word and a character string that identifies the second user;

calculating a similarity between the first distributed representation and the second distributed representation; and extracting a word associated with the second distributed representation on a basis of the similarity.

5. The non-transitory computer-readable recording medium according to claim 4, wherein the processing of calculating the first distributed representation includes calculating the first distributed representation of the first character string in which the first word and the character string that identifies the first user are concatenated, and the processing of calculating the second distributed representation includes calculating the second distributed representation of the second character string in which the second word and the character string that identifies the second user are concatenated.

6. The non-transitory computer-readable recording medium according to claim 5, wherein the processing of extracting a word includes: sorting the plurality of second character strings by the similarity in descending order on a basis of the corrected similarity; and extracting the word included in the second character string in the higher rank.

7. An information processing device comprising:

a memory; and a processor coupled to the memory and configured to:

acquire a first word input by a first user;

acquire a second word input by a second user;

calculate a first distributed representation of a first character string, the first character string including the first word and a character string that identifies the first user;

calculate a second distributed representation of a second character string, the second character string including the second word and a character string that identifies the second user;

calculate a similarity between the first distributed representation and the second distributed representation; and extract a word associated with the second distributed representation on a basis of the similarity.

8. The information processing device according to claim 7, wherein the processing of calculating the first distributed representation includes calculating the first distributed representation of the first character string in which the first word and the character string that identifies the first user are concatenated, and the processing of calculating the second distributed representation includes calculating the second distributed representation of the second character string in which the second word and the character string that identifies the second user are concatenated.

9. The information processing device according to claim 8, wherein the processing of extracting a word includes: sorting the plurality of second character strings by the similarity in descending order on a basis of the corrected similarity; and extracting the word included in the second character string in the higher rank.

* * * * *